(12) United States Patent
Lightner et al.

(10) Patent No.: US 10,467,828 B2
(45) Date of Patent: Nov. 5, 2019

(54) ELECTRONIC LOGGING DEVICE

(71) Applicant: J. J. Keller & Associates, Inc., Neenah, WI (US)

(72) Inventors: Bruce D. Lightner, La Jolla, CA (US); Michael K. Kuphal, Greenville, WI (US)

(73) Assignee: J. J. KELLER & ASSOCIATES, INC., Neenah, WI (US)

( * ) Notice: Subject to any disclaimer, the term of this patent is extended or adjusted under 35 U.S.C. 154(b) by 0 days.

(21) Appl. No.: 15/450,145

(22) Filed: Mar. 6, 2017

(65) Prior Publication Data
US 2018/0253915 A1 Sep. 6, 2018

(51) Int. Cl.
| | |
|---|---|
| G07C 5/08 | (2006.01) |
| G06Q 30/00 | (2012.01) |
| G06F 13/42 | (2006.01) |
| G07C 5/00 | (2006.01) |
| H01R 31/06 | (2006.01) |

(52) U.S. Cl.
CPC ....... G07C 5/0858 (2013.01); G06F 13/4282 (2013.01); G06Q 30/018 (2013.01); G07C 5/008 (2013.01); G07C 2205/02 (2013.01); H01R 31/065 (2013.01); H01R 2201/26 (2013.01)

(58) Field of Classification Search
CPC .................................................. G07C 5/0858
See application file for complete search history.

(56) References Cited

U.S. PATENT DOCUMENTS

| 7,447,574 | B1 | 11/2008 | Washicko et al. | |
|---|---|---|---|---|
| 8,480,433 | B2 | 7/2013 | Huang | |
| 8,700,254 | B2 | 4/2014 | Basir et al. | |
| 9,419,392 | B2 | 8/2016 | Kirkpatrick et al. | |
| 2006/0217855 | A1 | 9/2006 | Chinnadurai et al. | |
| 2007/0156311 | A1 | 7/2007 | Elock et al. | |
| 2012/0258628 | A1* | 10/2012 | Huang ................ | B60R 16/0232 439/620.21 |
| 2014/0047347 | A1* | 2/2014 | Mohn ..................... | G08G 1/00 715/738 |
| 2014/0067491 | A1 | 3/2014 | James et al. | |
| 2014/0279097 | A1* | 9/2014 | Alshobaki .............. | G06Q 20/10 705/16 |
| 2015/0317243 | A1 | 11/2015 | Green et al. | |
| 2016/0013598 | A1* | 1/2016 | Kirkpatrick ............ | H01R 24/68 439/620.21 |
| 2016/0125669 | A1* | 5/2016 | Meyer .................... | G07C 5/008 701/31.5 |
| 2017/0208697 | A1* | 7/2017 | Kurian .................. | H02J 7/0044 |

* cited by examiner

*Primary Examiner* — Imran K Mustafa
(74) *Attorney, Agent, or Firm* — Michael Best & Friedrich LLP (57) ABSTRACT

An electronic logging device dongle. In one example, dongle includes a housing and a circuit board located within the housing. The housing includes circuitry configured to perform at least part of a driver compliance determination and to wirelessly communicate with a portable device. The dongle also includes a connector electrically connected to the circuit board. The connector includes a plurality of pins, and is configured to be mated to a plurality of adaptors. Each of the plurality of adaptors is structured to mechanically map pins of a vehicle OBD port to the plurality of pins of the connector.

21 Claims, 11 Drawing Sheets

ELECTRONIC LOGGING DEVICE

FIELD

Embodiments relate to electronic logging devices.

BACKGROUND

Owner and drivers of commercial motor vehicles ("CMV's") are required to comply with certain regulations governing such vehicles. In the United States of America, the U.S. Department of Transportation, Federal Motor Carrier Safety Administration ("FMCSA") promulgates various regulations including, for example, hours-of-service regulations (which limit the number of hours a driver may drive a CMV). Traditionally, drivers and operators of CMVs maintained paper logs to facilitate compliance with hours-of-service and other regulations. More recently, electronic logging devices (ELDs) have replaced traditional systems and, in some cases have been designed to provide functions and features not available in prior systems.

SUMMARY

Many ELDs rely on information regarding the performance and activity of the CMV. One way in which information regarding the operation of a vehicle may be obtained is through an on-board diagnostic ("OBD") port. An OBD port may be connected to a vehicle information bus, a vehicle control unit (VCU), a vehicle diagnostics system, or a combination of these components. As discussed in further detail below, the physical configuration of an OBD port of a vehicle may vary depending on the communication protocol used by the vehicle. An interconnection, such as an adaptor, may be required to couple an ELD to the OBD port to communicate with the VCU of the vehicle.

Accordingly, embodiments of the invention provide an electronic logging device dongle comprising a housing, a circuit board, and a connector. The circuit board is located within the housing and has circuitry configured to perform at least part of a driver compliance determination and to wirelessly communicate with a portable device. The connector is electrically connected to the circuit board. The connector has a plurality of pins and is configured to be mated with a plurality of adaptors. Each of the plurality of adaptors is structured to mechanically map pins of a vehicle OBD port to the plurality of pins of the connector.

A further embodiment of the invention provides a vehicle logging system comprising an electronic logging device dongle and an adaptor. The dongle includes a housing, a circuit board and a connector. The circuit board located is located within the housing and has circuitry configured to perform at least part of a driver compliance determination and to wirelessly communicate with a portable device. The connector is electrically connected to the circuit board. The connector has a plurality of pins and is configured to be mated with a plurality of adaptors. The adaptor includes a first set of pins and a second set of pins. The first set of pins is configured to be mated with the connector of the electronic logging device. The second set of pins is configured to be mated with the pins of a vehicle OBD port. The second set of pins is mechanically mapped to the first set of pins.

Other aspects of the invention will become apparent by consideration of the detailed description and accompanying drawings.

DETAILED DESCRIPTION

Before any embodiments are explained in detail, it is to be understood that embodiments described herein are not limited in their application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. Also, electronic communications and notifications may be performed using any known means including direct connections (for example, wired or optical), wireless connections, or other communication.

It should also be noted that a plurality of hardware and software based devices, as well as a plurality of different structural components may be utilized to implement various embodiments. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects of the invention may be implemented in software (for example, stored on non-transitory computer-readable medium)

executable by one or more processors. As such, it should be noted that a plurality of hardware and software based devices, as well as a plurality of different structural components may be utilized to implement the invention.

Figure 1A:
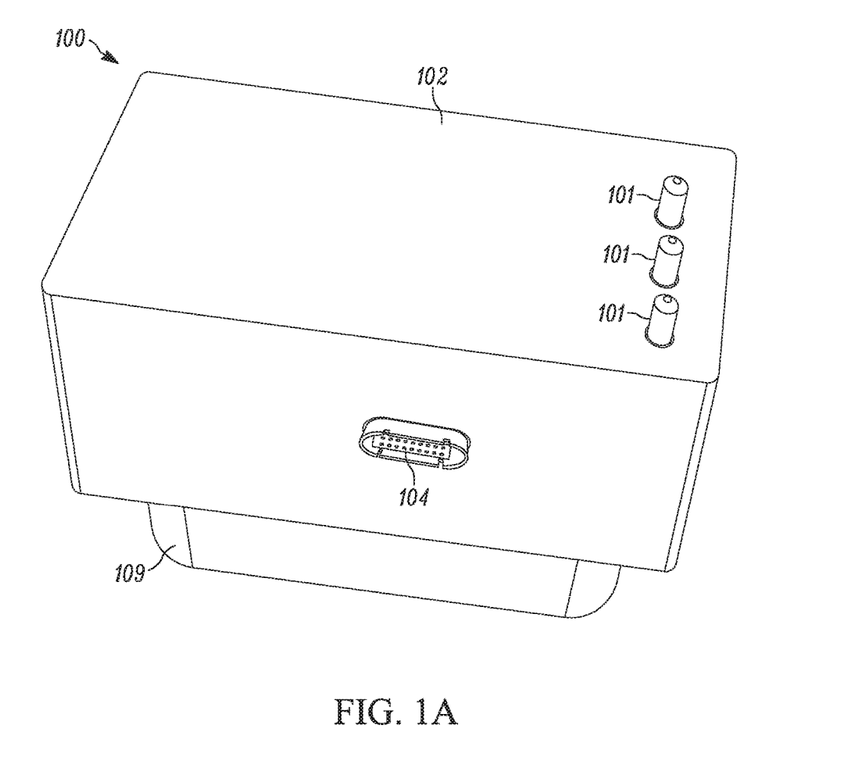
FIG. 1a illustrates an electronic logging device (ELD).

FIG. 1a illustrates an electronic logging device (ELD) 100. In the example illustrated, the ELD 100 includes a housing 102, a universal serial bus (USB) port 104, a plurality of light emitting diodes (LEDs) 101 and an ELD adaptor connector 109, described in more detail below. In some embodiments, the ELD 100 further includes at least one user-actuated device, such as a switch or a push-button. In the example illustrated, the ELD 100 is designed to be an electronic logging device dongle or similar device that is relatively small and designed to be connected to one or more computers, such as a VCU 107 within a vehicle through an OBD port 106 (both illustrated in FIG. 1c) of a vehicle (the vehicle OBD port).

Figure 1B:
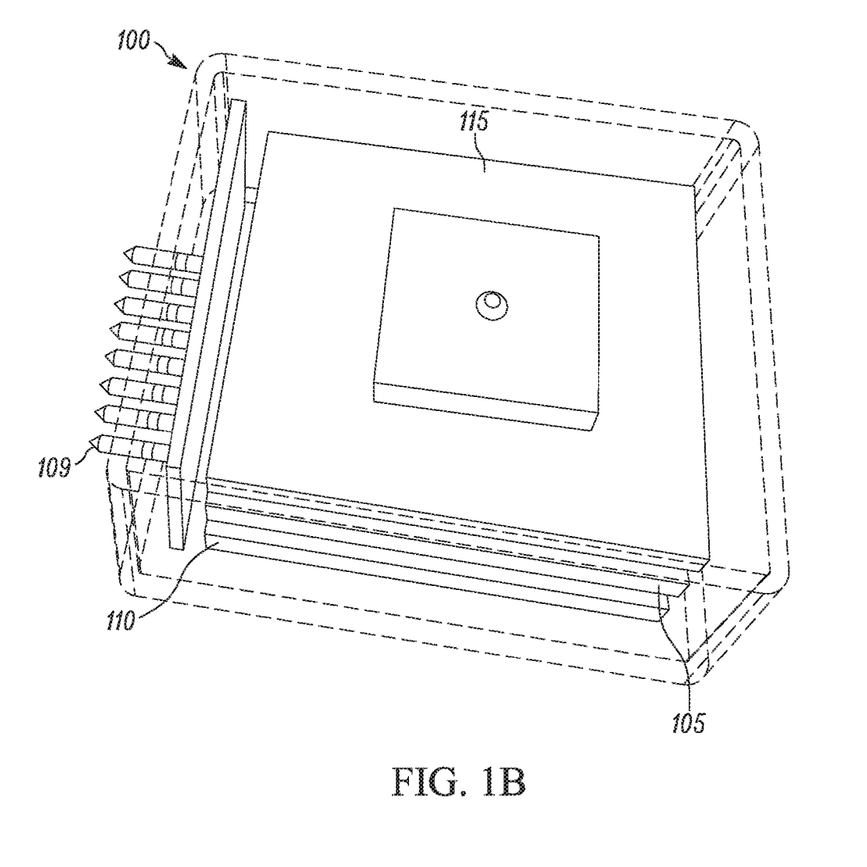
FIG. 1b illustrates the layout of the components of the ELD of FIG. 1 without the housing of the ELD according to one embodiment.

FIG. 1b illustrates the circuitry within the housing 102 of ELD 100. Inside the housing 102, the ELD 100 includes three circuit boards electrically connected to each other: an application processor circuit board 105, a vehicle data communication circuit board 110, and a positioning information circuit board 115. The ELD adaptor connector 109 is electrically connected to the vehicle data communication circuit board 110. The application processor circuit board 105, the vehicle data communication circuit board 110, and the positioning information circuit board 115 each contain circuitry necessary to perform at least part of a driver compliance determination. For example, the application processor circuit board 105 may execute known driver compliance software.

Figure 1C:
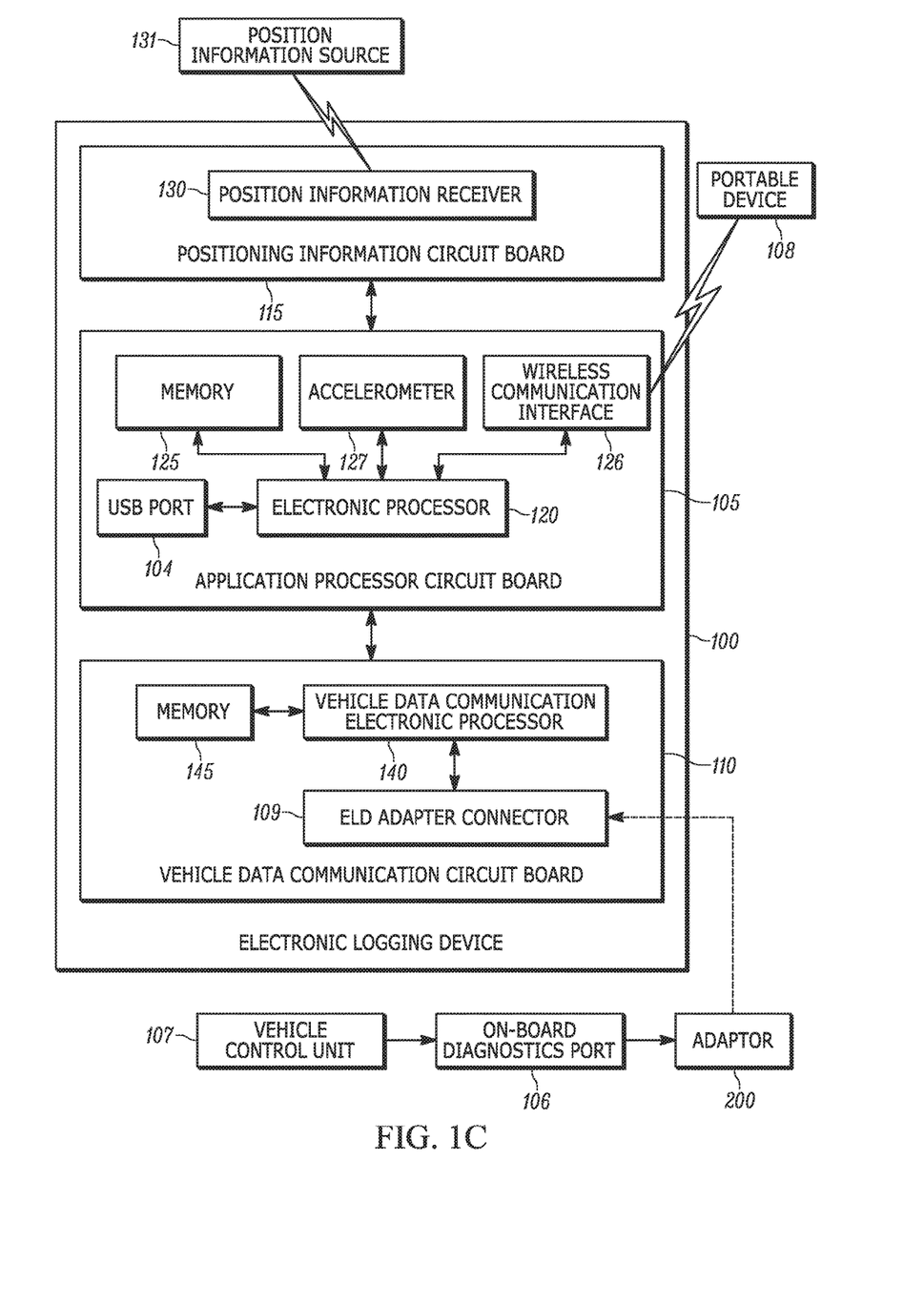
FIG. 1c. schematically illustrates the components of the ELD of FIG. 1 according to one embodiment.

FIG. 1c is a block diagram illustrating the internal components of the circuit boards of the ELD 100. In the example illustrated, the application processor circuit board 105 includes an electronic processor 120, the USB port 104, and a memory 125. The ELD 100 may also include a wireless communication interface 126. The wireless communication interface 126 is configured to wirelessly communicate with a portable device 108 in accordance with a wireless communication protocol such as Bluetooth, Wi-Fi, and other protocols. The ELD 100 may also include an accelerometer 127. The electronic processor 120 executes software applications of the ELD 100. The software applications, explained in further detail later, control the ELD 100 to allow communication with the OBD port 106 of a vehicle and with the portable device 108, such as a mobile phone.

The positioning information circuit board 115 includes a position information receiver 130 that provides vehicle position and/or time information to the electronic processor 120 of the application processor circuit board 105. The position information receiver 130 receives positioning and time information from a positioning information source 131 located outside the ELD 100, for example, via an antenna (not shown). In some embodiments, the position information receiver 130 is a global positioning system (GPS) receiver and the positioning information source 131 is a GPS satellite. Using the positioning information, the electronic processor 120 or a microprocessor (not shown) within the positioning information circuit board 115 is able to calculate information relative to the vehicle's location and time information.

The vehicle data communication circuit board 110 includes a vehicle data communication electronic processor 140, a second memory 145, and the ELD adaptor connector 109. The ELD adaptor connector 109 is configured to be mated to an adaptor 200. The adaptor 200 is configured to be secured to the specific configuration of the OBD port 106, as explained in further detail below. The ELD adaptor connector 109 receives data from the VCU 107 via the OBD port 106 through an adaptor 200. The vehicle data communication electronic processor 140 processes data received through the OBD port 106.

Figure 2A:
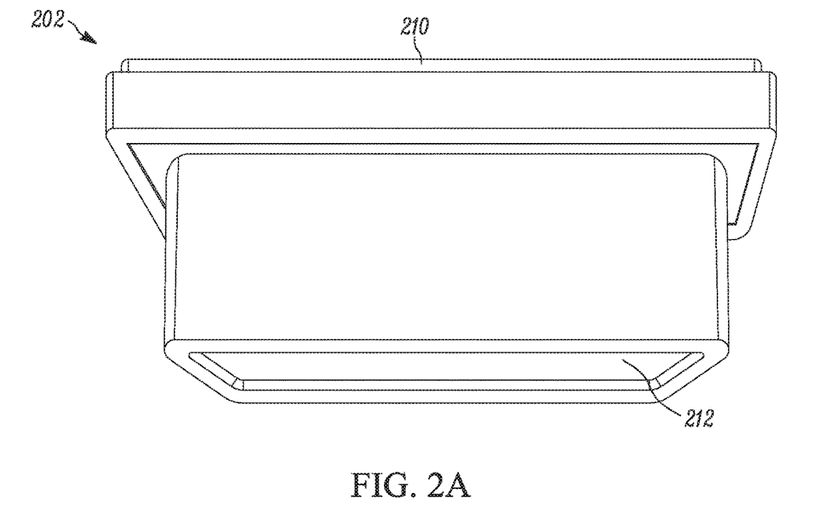
FIG. 2a. illustrates an adaptor according to one embodiment.
Figure 2B:
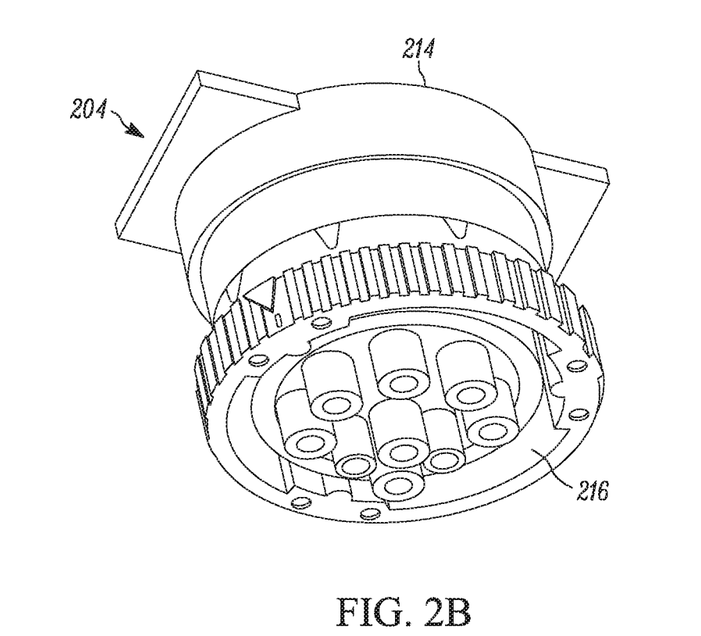
FIG. 2b illustrates another adaptor according to another embodiment.
Figure 2C:
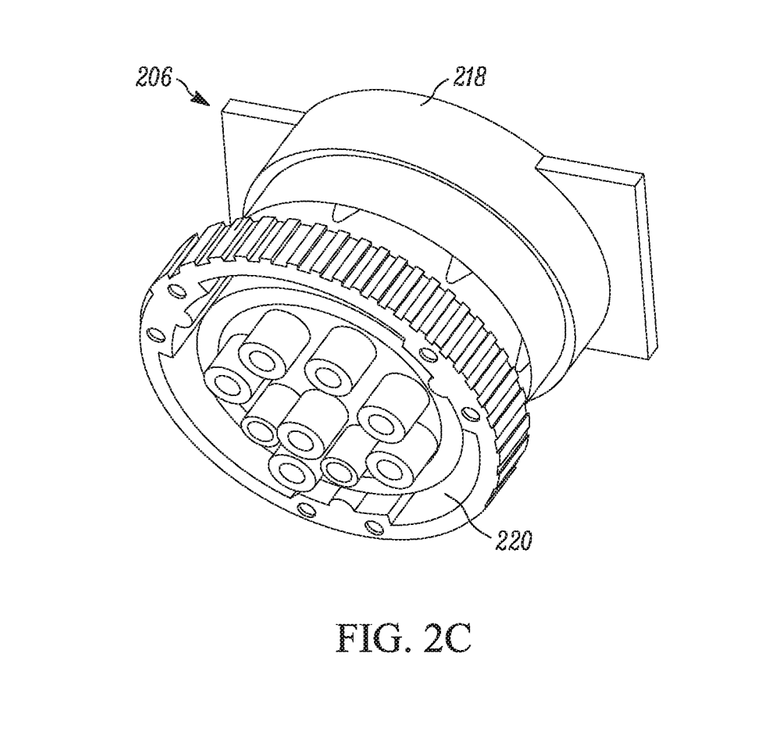
FIG. 2c illustrates another adaptor according to yet another embodiment.

FIGS. 2a-2c each illustrate an adaptor 202, 204, and 206 respectively. Each of the adaptors 202, 204, and 206 include two sets of pins. FIG. 2a illustrates the adaptor 202. The adaptor 202 includes a first set of pins 210 to be mated to the ELD adaptor connector 109 of the ELD 100 and a second set of pins 212 to be connected to the OBD port of the vehicle. FIG. 2b illustrates the adaptor 204. Similar to the adaptor 202, the adaptor 204 includes a first set of pins 214 to be connected to the ELD adaptor connector 109 of the ELD 100 and a second set of pins 216 (in a different configuration than the second set of pins 212 of adaptor 202). FIG. 2c illustrates the adaptor 206. The adaptor 206 includes a first set of pins 218 to be connected to the ELD adaptor connector 109 and a second set of pins 220 arranged in a configuration that is different from the configuration of both the second pin sets 212 of adaptor 202 and the second set of pins 216 of adaptor 204.

The second set of pins 212, 216, and 220 differ between adaptors to correlate with the different types of OBD ports used to communicate with the self-diagnostic system of a vehicle. The ELD adaptor connector 109 communicates with the diagnostic system of a vehicle through an OBD port of the vehicle via one of the plurality of adaptors 202, 204, and 206.

One of the adaptors 202, 204, or 206 is used as the adaptor 200 of FIG. 1. The type of adaptor 200 used depends on the type of OBD port 106. The type of OBD port 106 varies depending on, for example, the digital communication protocol of the VCU 107. Different communication protocols often require different configurations of the pins (including the number of pins) of the OBD port 106. Examples of different configuration types include: OBD-I, OBD-II, J1939 9-pin configuration, and the J1939 6-pin configuration. In the examples illustrated, each adaptor's second set of pins correspond to at least one type of OBD port 106. Each communication protocol not only varies in the number of pins, but also the type of information the pins output. For example, the J1939 9-pin protocol requires nine pins while the J1939 6-pin configuration requires six pins.

Figure 2D:
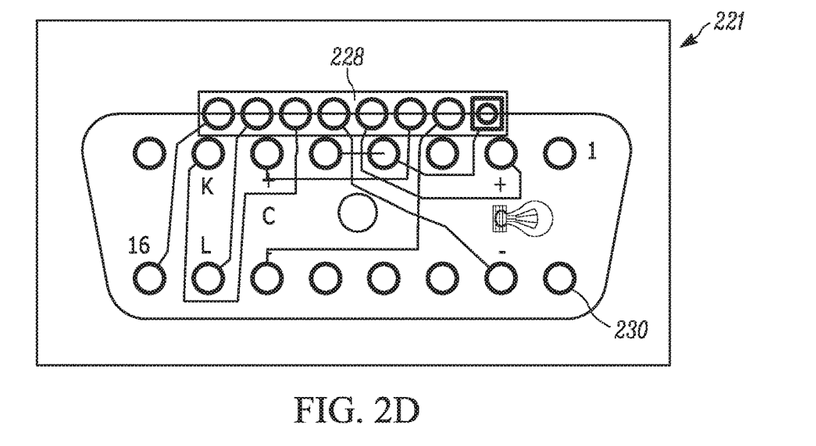
FIG. 2d. illustrates a circuit board with pin mapping of the adaptor of FIG. 2a according to one embodiment.
Figure 2E:
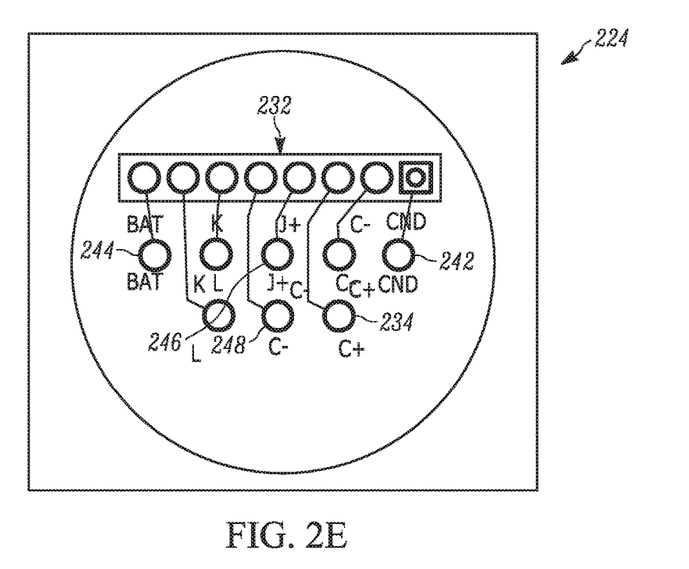
FIG. 2e illustrates a circuit board with pin mapping of the adaptor of FIG. 2b according to yet another embodiment.
Figure 2F:
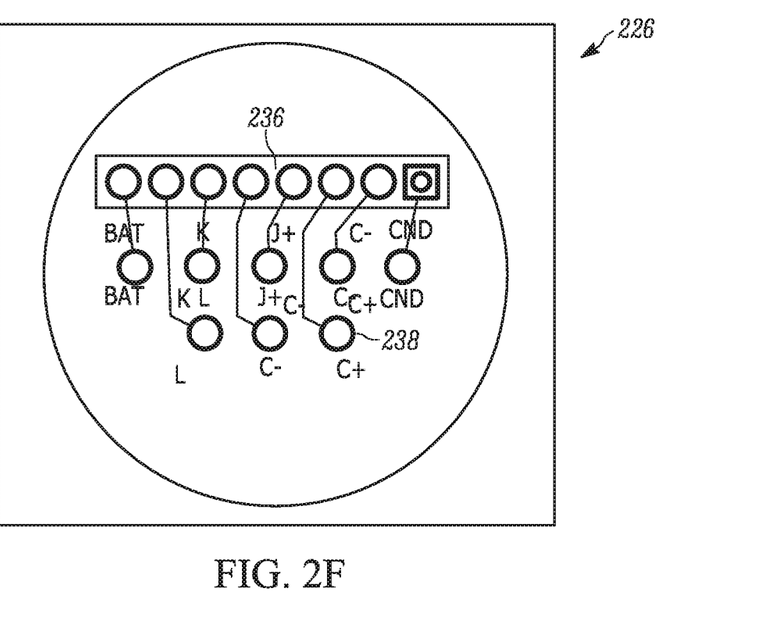
FIG. 2f illustrates a circuit board with pin mapping of the adaptor of FIG. 2c according to yet another embodiment.

FIGS. 2d-2f each illustrates a circuit board 221, 224, and 226 with the pin mapping inside the adaptor 202, 204, and 206 respectively. FIG. 2d illustrates the circuit board 221 within the adaptor 202. The circuit board 221 includes a first set of terminals 228 and a second set of terminals 230. The each terminal of the first set of terminals 228 is electrically connected to the at least one pin of the first set of pins 210 (not shown). Likewise, each terminal of the second set of terminals 230 is electrically connected to at least one pin of the second set of pins 212 (not shown). The first set of pins 210 are mechanically mapped to the second set of pins 212 via the first and second set of terminals 228 and 230. Specifically, each terminal of the first set of terminals 228 is mechanically mapped to at least one terminal of the second set of terminals 230.

FIG. 2e illustrates the circuit board 224 within the adaptor 204. The circuit board 224 includes a first set of terminals 232 and a second set of terminals 234. The each terminal of the first set of terminals 232 is electrically connected to the at least one pin of the first set of pins 214 (not shown). Likewise, each terminal of the second set of terminals 234 is electrically connected to at least one pin of the second set of pins 216 (not shown). The first set of pins 214 are mechanically mapped to the second set of pins 216 via the first and second set of terminals 232 and 234. Specifically, each terminal of the first set of terminals 232 is mechanically mapped to at least one terminal of the second set of terminals 234.

FIG. 2f illustrates the circuit board 226 within the adaptor 206. The circuit board 226 includes a first set of terminals 236 and a second set of terminals 238. The each terminal of the first set of terminals 236 is electrically connected to the at least one pin of the first set of pins 218 (not shown). Likewise, each terminal of the second set of terminals 238 is electrically connected to at least one pin of the second set of pins 220 (not shown). The first set of pins 218 are mechanically mapped to the second set of pins 220 via the first and second set of terminals 236 and 238. Specifically, each terminal of the first set of terminals 236 is mechanically mapped to at least one terminal of the second set of terminals 238.

The second set of pins 212, 216, and 220 are mechanically mapped as described to the first set of pins 210, 214, and 218 of the adaptor 202, 204, and 206 respectively such that the correct type of data of the pin from the OBD port 106 is sent from the pin of the first set to the corresponding pin in the ELD adaptor connector 109. By mechanically mapping each of the plurality of adaptors, connectivity is provided while reducing or eliminating the need for electronic components, such as transistors, to switch signals. The adaptor 206 utilizes the same circuit board 226 as that of the adaptor 204 (circuit board 224) illustrated in FIG. 2e. However, within the adaptor 204, all of the terminals of the second set of terminals 238 are electrically coupled to a number less than the total number of pins of the second set of pins 216 (not shown). In some embodiments, the second set of pins 216 are electrically connected to only a GND terminal 242, a BAT terminal 244, a J+ terminal 246, and a J− terminal 248 of the second set of terminals 234. Within adaptor 206, every terminal of the second set of terminals 238 are electrically coupled to the second set of pins 220.

Preferably, each adaptor's second set of pins is configured for one type of OBD port. For example, the second set of pins 220 of the adaptor 206 contains eight pins and is configured for a 9-pin OBD port. The wiring inside adaptor 206 is arranged to map each of the eight pins of the second set of pins 220 to a corresponding pin of the first set of pins 218 to be connected to the ELD adaptor connector 109 of the ELD 100.

Some adaptors may be configured for more than one type of OBD port 106. For example, the adaptor 202 provides two groups of pins in the second set of pins 212. Adaptor 202 has sixteen pins, ten of which are arranged to fit a light-weight OBD II port of a vehicle. Another ten pins of the second set of pins 212 are arranged to comply with the Volvo/Mack heavy-weight OBD II port of a vehicle. By rotating the adaptor 202 180° degrees, the adaptor may be used for either light-weight OBD II or heavy-weight OBD II protocol.

Figure 3A:
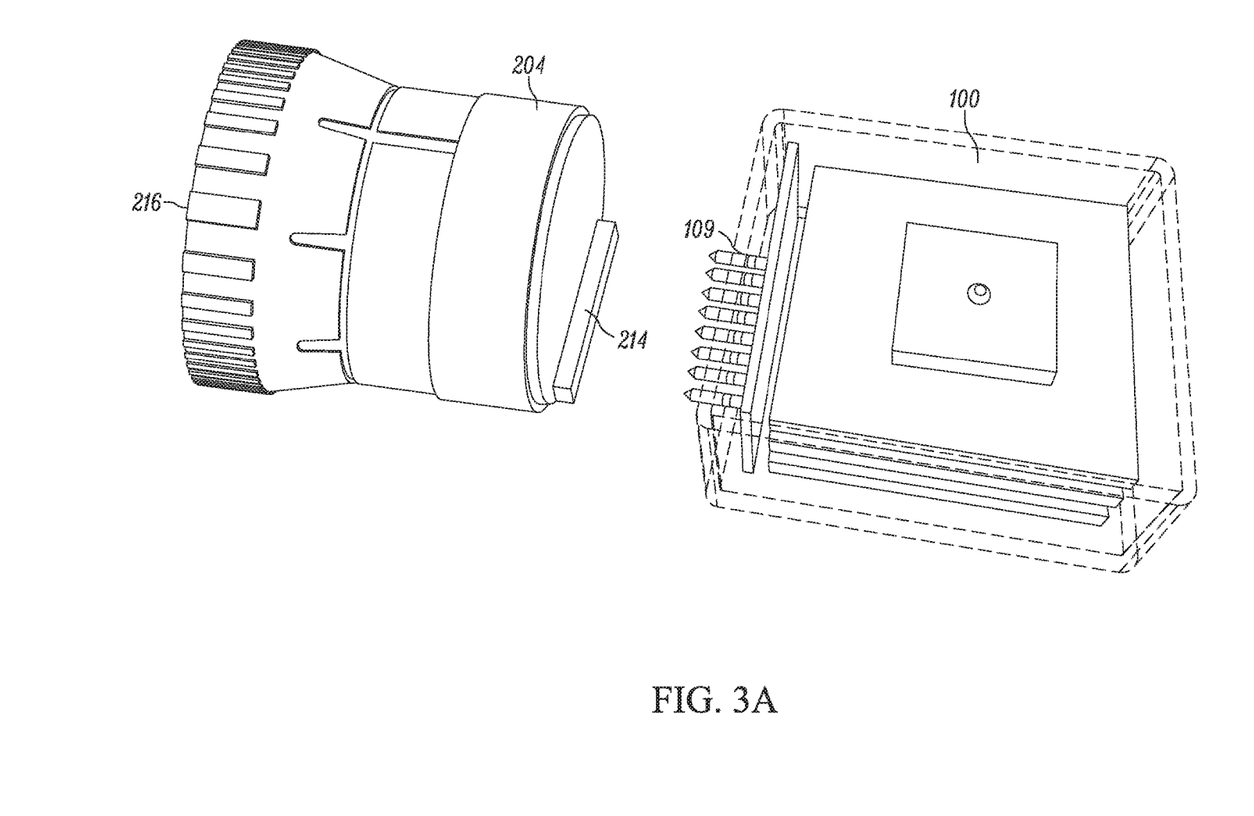
FIG. 3a illustrates the ELD of FIG. 1 and the adaptor of FIG. 2b according to one embodiment.

FIG. 3a illustrates an implementation of the ELD 100 with the adaptor 204. The ELD 100 and the adaptor 204 are coupled together via the ELD adaptor connector 109 and the first set of pins 214 of the adaptor 204. The second set of pins 216 are exposed, allowing the ELD to be able to be connected and communicate with the OBD port 106. It should be understood that the other adaptors 202 and 206 would be connected to ELD 100 in a manner that is similar to that shown with respect to the adaptor 204 and their second set of pins (212 or 220 respectively) to be connected to the corresponding type of the OBD port 106.

Figure 3B:
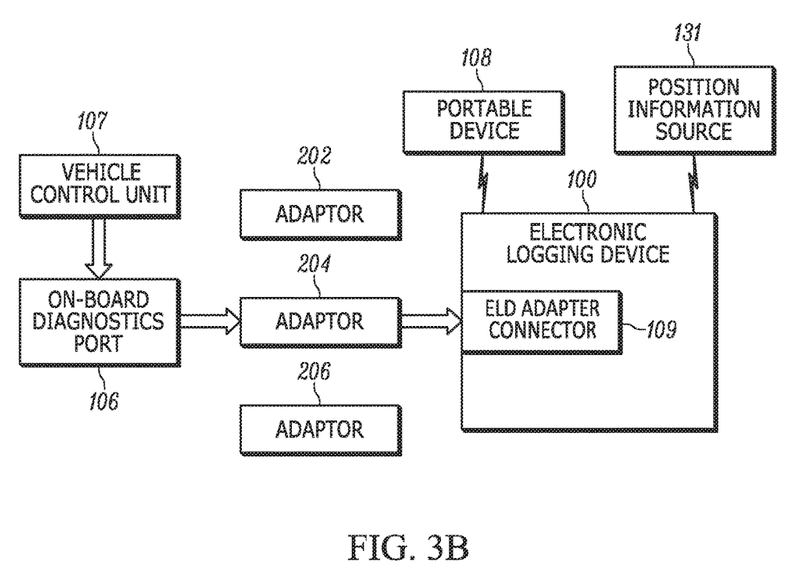
FIG. 3b schematically illustrates a system implementation of the ELD of FIG. 1 and the adaptors of FIG. 2a-2c according to one embodiment.

FIG. 3b schematically illustrates a system implementation of the ELD 100. The VCU 107 of a vehicle is coupled to the OBD port 106. As previously discussed, the OBD port 106 may vary in pin connector number/configuration depending on the type of communication protocol the VCU 107 uses. Based on the communication protocol/configuration of the OBD port 106, one of the plurality of adaptors 202, 204, or 206 with the corresponding configuration of pins is selected and connected to the OBD port 106. The first set of pins 210, 214, or 218 (depending on the adaptor selected) is connected to the ELD adaptor connector 109 of the ELD 100.

As discussed with respect to FIG. 1c, the vehicle data communication circuit board 110 of ELD 100 is tasked with requesting and processing of data received from the VCU 107. Processing performed by the vehicle data communication circuit board 110 includes, for example, determining the type of protocol the VCU 107 is using. The ELD 100 receives the protocol information and data from the vehicle data communication circuit board 110 and forwards it to the application processor circuit board 105. The application processor circuit board 105 may further process the data, as well as execute functions such as determining driver compliance. The application processor circuit board 105 of the ELD 100 may communicate such information, as well as positioning information from the position information receiver 130, with the portable device 108 via the wireless communication interface 126.

Figure 4:
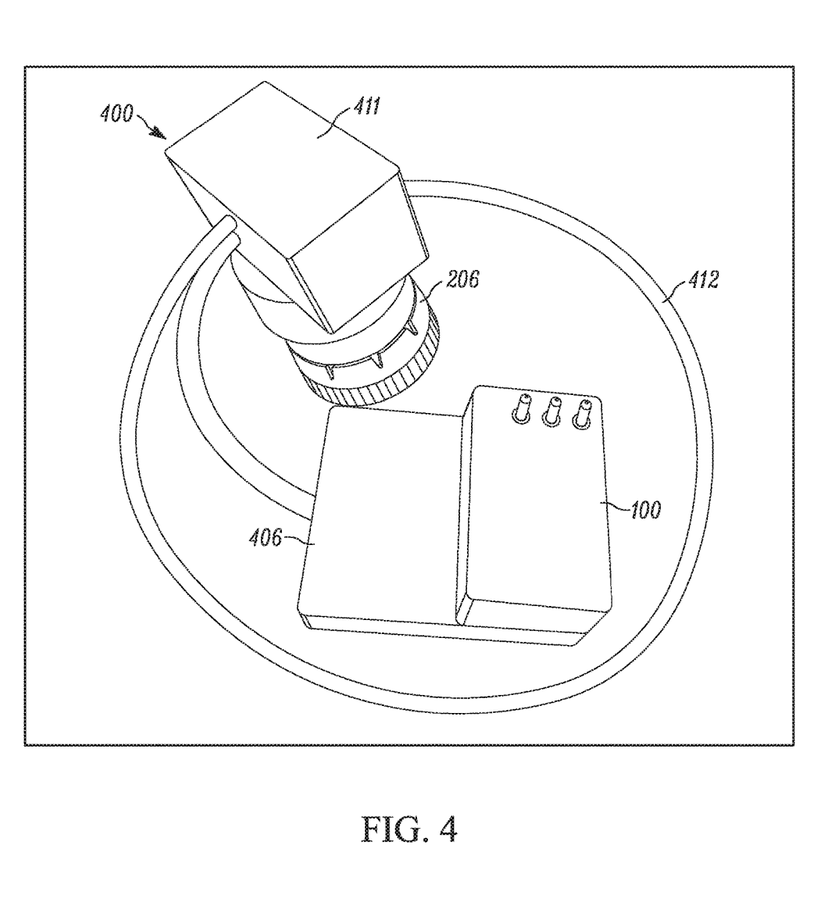
FIG. 4 illustrates an implementation of an extension cable with the ELD of FIG. 1 and the adaptor of FIG. 2c according to one embodiment.

FIG. 4 illustrates an implementation of an extension cable 400. The extension cable 400 has a first set of pins 405 (not shown) within a first housing 406 and a second set of pins 410 (not shown) within a second housing 411. The first housing 406 and the second housing 411 are connected to each other via a cable 412. The first set of pins 405 is configured to be mated (or connected) to the ELD adaptor connector 109 of the ELD 100 while the second set of pins 410 is configured to be coupled to the first set of pins 210, 214, or 216 of one of the adaptors 202, 204, or 206 (shown is the adaptor 206). The second set of pins 215 of the connected adaptor 206 is to be connected to the OBD port 106. The extension cable 400 is thus structured to allow the ELD 100 to be mounted a distance away from the adaptor 206.

Figure 5:
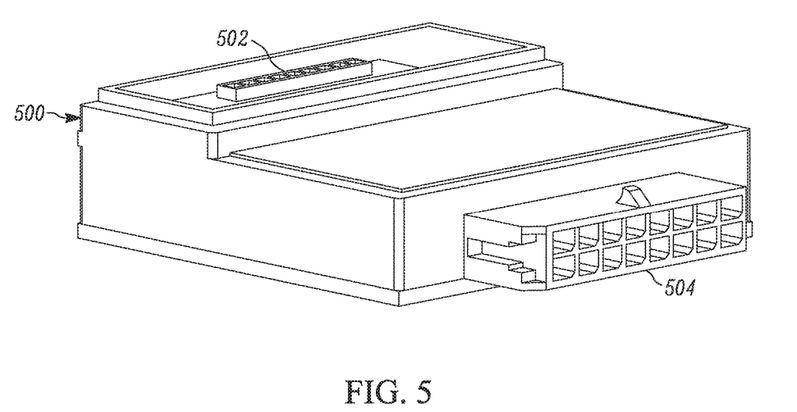
FIG. 5 illustrates a harness adaptor according to one embodiment.

FIG. 5 illustrates a harness adaptor 500. The harness adaptor 500 includes a first set of pins 502 and a second set of pins 504. The harness adaptor 500 functions similar to the adaptors 202, 204, and 206 of FIG. 2. The first set of pins 502 is configured to be coupled to the ELD 100. However, the second set of pins 504 (which is different from the first set of pins 502) is configured to be connected to an OBD Y-harness. In one example, the second set of pins 504 includes sixteen pins. The OBD Y-harness may then be connected to another telematics device and/or a conventional scanner.

Various features and advantages of the invention are set forth in the following claims.

What is claimed is:

1. An electronic logging device dongle comprising:
   a housing;
   a circuit board located within the housing and having circuitry configured to perform at least part of a driver compliance determination and to wirelessly communicate with a portable device; and
   a connector electrically connected to the circuit board, having a plurality of pins, and configured to be mated to a plurality of adaptors;

wherein each of the plurality of adaptors includes
a first set of pins arranged in a first configuration configured to be mated to the connector, and
a second set of pins arranged in a second configuration, different from the first configuration and configured to be mated to a vehicle OBD port,
wherein each of the plurality of adaptors is structured to mechanically map pins of the vehicle OBD port to the plurality of pins of the connector via the first set of pins and the second set of pins, and
wherein the second set of pins of at least-one of the plurality of adaptors is configured to mate to both a first type of vehicle OBD port and to a second type of vehicle OBD port.

2. The dongle as claimed in claim 1, wherein the connector has ten pins.

3. The dongle as claimed in claim 1, wherein at least one of the plurality of adaptors includes ten pins to mechanically map the pins of the vehicle OBD port to the plurality of pins of the connector.

4. The dongle as claimed in claim 3, wherein the at least one of the plurality of adaptors includes more than one set of a plurality of pins.

5. The dongle as claimed in claim 1, wherein at least one of the plurality of adaptors includes nine pins.

6. The dongle as claimed in claim 1, wherein at least one of the plurality of adaptors includes six pins.

7. The dongle as claimed in claim 1, wherein at least one of the plurality of adaptors includes sixteen pins to mechanically map pins of the vehicle OBD port through a Y-harness to the connector.

8. The dongle as claimed in claim 1, wherein the connector is further configured to be mated with an extension cable, the extension cable structured to be mated with the plurality of adaptors.

9. The dongle as claimed in claim 1, wherein the dongle includes at least one universal serial bus port.

10. The dongle as claimed in claim 1, wherein the dongle includes at least one light emitting diode.

11. The dongle as claimed in claim 1, wherein the dongle includes at least one user-actuated device.

12. The dongle as claimed in claim 1, wherein the dongle further includes a position information receiver.

13. A vehicle logging system, the system comprising:
an electronic logging device dongle, the dongle including
a housing;
a circuit board located within the housing and having circuitry configured to perform at least part of a driver compliance determination and to wirelessly communicate with a portable device; and
a connector electrically connected to the circuit board, having a plurality of pins, and configured to be mated to a plurality of adaptors; and
an adaptor, the adaptor including
a first set of pins arranged in a first configuration configured to be mated with the connector of the electronic logging device; and
a second set of pins arranged in a second configuration configured to be mated with the pins of a vehicle OBD port;
wherein the second set of pins is mechanically mapped to the first set of pins, and
wherein the second configuration is configured to mate with a first type of vehicle OBD port and a second type of vehicle OBD port.

14. The vehicle logging system of claim 13, wherein the connector is further configured to be mated with an extension cable, the extension cable structured to be mated with the first set of pins of the adaptor.

15. The vehicle logging system of claim 13, the system further including a Y-harness and wherein the second set of pins of the adaptor is further configured to mechanically map pins of the vehicle OBD port through the harness to the connector.

16. The vehicle logging system of claim 13, wherein the dongle further includes at least one user-actuated device.

17. The vehicle logging system of claim 13, wherein the dongle further includes at least one light emitting diode.

18. The vehicle logging system of claim 13, wherein the dongle further includes at least one universal serial bus port.

19. The vehicle logging system of claim 13, wherein the dongle further includes a position information receiver.

20. An electronic logging device dongle comprising:
a housing;
a circuit board located within the housing and having circuitry configured to perform at least part of a driver compliance determination and to wirelessly communicate with a portable device; and
a connector electrically connected to the circuit board, having a plurality of pins, and configured to be mated to a plurality of adaptors;
wherein each of the plurality of adaptors includes
a first set of pins configured to be mated to the connector, and
a second set of pins configured to be mated to a vehicle OBD port,
wherein each of the plurality of adaptors is structured to mechanically map pins of the vehicle OBD port to the plurality of pins of the connector via the first set of pins and the second set of pins, and
wherein the second set of pins of at least one of the plurality of adaptors is configured to be mated to a first type of vehicle OBD port when the second set of pins are in a first position, and to be mated to a second type of vehicle OBD port when the second set of pins are rotated from the first position to a second position.

21. The vehicle logging system of claim 13, wherein the second set of pins is configured to be mated to the first type of vehicle OBD port when the second set of pins are in a first position, and to be mated to the second type of vehicle OBD port when the second set of pins are rotated from the first position to a second position.

* * * * *